(12) United States Patent
Arunachalam et al.

(10) Patent No.: US 9,129,024 B2
(45) Date of Patent: Sep. 8, 2015

(54) GRAPHICAL USER INTERFACE IN KEYWORD SEARCH

(71) Applicant: International Business Machines Corporation, Armonk, NY (US)

(72) Inventors: Krishnarajan Arunachalam, Idappadi (IN); Adam S. Biener, Vestal, NY (US); Stanley P. Cason, Johnson City, NY (US); Sunil Joshi, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 13/659,967

(22) Filed: Oct. 25, 2012

(65) Prior Publication Data

US 2014/0122464 A1 May 1, 2014

(51) Int. Cl.
*G06F 17/30* (2006.01)
(52) U.S. Cl.
CPC .................. *G06F 17/30867* (2013.01)
(58) Field of Classification Search
CPC ............ G06F 17/30867; G06F 17/30716; G06F 17/30719; G06F 17/30958; G06F 17/30657; G06F 17/30247; G06F 3/04842
See application file for complete search history.

(56) References Cited

U.S. PATENT DOCUMENTS

| 6,226,645 | B1 | 5/2001 | Bae et al. | |
|---|---|---|---|---|
| 2004/0024751 | A1* | 2/2004 | Petrisor et al. | 707/3 |
| 2005/0149494 | A1* | 7/2005 | Lindh et al. | 707/3 |
| 2008/0005107 | A1 | 1/2008 | Funaki | |
| 2008/0313170 | A1 | 12/2008 | Kamen | |
| 2009/0319518 | A1* | 12/2009 | Koudas et al. | 707/5 |
| 2010/0004975 | A1* | 1/2010 | White et al. | 705/10 |
| 2010/0138428 | A1 | 6/2010 | Uchino et al. | |
| 2013/0124538 | A1* | 5/2013 | Lee et al. | 707/749 |
| 2013/0262449 | A1* | 10/2013 | Arroyo et al. | 707/722 |

FOREIGN PATENT DOCUMENTS

EP 2136301 A1 12/2009

OTHER PUBLICATIONS

Begelman et al., "Automated Tag Clustering: Improving Search and Exploration in the Tag Space" WWW2006, May 22-26, 2006, Edinburgh, UK [online], [retrieved on Apr. 20, 2012]. Retrieved from the Internet <URL: http://www.pui.ch/phred/automated_tag_clustering/automated_tag_clustering.pdf>.

Hassan-Montero et al., "Improving Tag-Clouds as Visual Information Retrieval Interfaces" International Conference on Multidisciplinary Information Sciences and Technologies, InSciT2006, Merida Spain, Oct. 25-28, 2006 [online], [retrieved on Apr. 20, 2012]. Retrieved from the Internet <URL: http://www.nosolousabilidad.com/hassan/improving_tagclouds.pdf>.

(Continued)

*Primary Examiner* — Yuk Ting Choi
(74) *Attorney, Agent, or Firm* — Edward Li

(57) ABSTRACT

A method and computer program product for conducting a weighted keyword search and a method for displaying search results. A computer determines respective weights of respective keywords, based on proximity of a user interaction position to the respective keywords on a graphical presentation. The computer conducts a weighted keyword search of documents based on the keywords and the respective weights of the keywords. In a method of displaying search results, based on the respective weights, a computer displays the search results associated with the respective keywords.

10 Claims, 8 Drawing Sheets

(56) References Cited

OTHER PUBLICATIONS

Disclosed Anonymously, "A Method and System for Visualizing Changes in Relationships Between Keyword-Associated Resources Over Time", Sep. 12, 2011, IP.com [online], [retrieved on Apr. 20, 2012]. Retrieved from: Prior Art Database, IP.com No. IPCOM000210855D.

Kaser et al., "Tag-Cloud Drawing: Algorithms for Cloud Visualization" WWW2007, May 8-12, 2007, Banff, Canada [online], [retrieved on Apr. 26, 2012]. Retrieved from the Internet <URL: http://www2007.org/workshops/paper_12.pdf>.

Ohshima et al., "Seeing Past Rivals: Visualizing Evolution of Coordinate Terms Over Time" Web Information Systems Engineering—WISE 2009. Proceedings 10th International Conference, pp. 167-180, 2009, Springer Verlag [online], [retrieved on Apr. 26, 2012]. Retrieved from the Internet <URL: http://www.dl.kuis.kyoto-u.ac.jp/~adam/wise09.pdf>.

Wikipedia, "File:Web 2.0 Map.svg", Published on: Feb. 28, 2007, Wikipedia, the free encyclopedia [online], [retrieved on Apr. 20, 2012]. Retrieved from the Internet <URL: http://en.wikipedia.org/wiki/File:Web_2.0_Map.svg>.

\* cited by examiner

GRAPHICAL USER INTERFACE IN KEYWORD SEARCH

FIELD OF THE INVENTION

The present invention relates generally to keyword search, and more specifically to specification of keyword search using a graphical user interface.

BACKGROUND

In tagging systems used by social networking sites, news sites, blogs, or e-commerce sites, each story or product is associated with user-defined tags. In keyword indexing systems used by search engines or glossary generators, each document is automatically associated with keywords via a keyword extraction algorithm. Currently, the most popular method of visualizing tag data in aggregate is through the use of a tag cloud where a number of key words representing content of an associated document are displayed together. A tag cloud typically displays all tags in a system in alphabetical order, with font size determined by relative usage.

U.S. Pat. No. 6,226,645 B1 (Bae et al., 2001) discloses an Internet searching method. The disclosure describes a method for searching keyword described in web document and considering hyper link connection between searched keywords and constructing conceptional drawings which are made of keywords connected to searched words inputted by user.

US Pat. Pub. No. 20080005107 A1 (Funaki, 2008) relates to a technique for managing a keyword that is set to a file for the purpose of searching files. The disclosure describes a keyword management apparatus for managing a relationship among a plurality of keywords used to search a file. A keyword database stores a plurality of keywords and hierarchical relationship information by defining a hierarchical relationship among the keywords. A tree creation unit creates a plurality of keyword trees by utilizing the hierarchical relationship information. A designation unit designates a first keyword belonging to a first keyword tree by referring to the keyword database. A search unit searches for a second keyword that corresponds to the first keyword and belongs to a second keyword tree, and searches for a keyword on a layer above the second keyword obtained on the basis of the hierarchical relationship information. A display unit displays the search unit's search results.

US Pat. Pub. No. 20080313170 A1 (Kamen, 2008) pertains to technology used for data search, particularly data search over the Internet. As described in this disclosure, a method and apparatus, for any given keyword, generates a numeric value that defines keyword relevance based on the numeric value and importance of a keyword's forward link and back link keyword neighbors.

US Pat. Pub. No. 20100138428 A1 (Uchino et al., 2010) is directed to a keyword output apparatus and a keyword output method. In the apparatus and method, a commonness between expressions corresponding to a target keyword and each related keyword is calculated, and an association between a target keyword and each related keyword is calculated using a distance for each related keyword from the target keyword and the commonness, and a related keyword having a certain association is extracted as a same-region keyword in a same region as the target keyword. In the apparatus and method, a drawing including the target keyword and related keywords arranged according to the associations is output with the same-region keyword displayed distinguishably from other related keywords not included in the same region.

SUMMARY

Embodiments of the present invention provide a method for displaying search results. A computer displays respective keywords on a graphical presentation. The computer receives a user interaction position on the graphical presentation. The computer determines respective weights of the respective keywords, based on proximity of the user interaction position to the respective keywords. The computer displays the search results associated with the respective keywords, based on the respective weights.

Embodiments of the present invention provide a method and computer program product for conducting a weighted keyword search. A computer displays a graphical presentation showing respective keywords, in response to receiving a request for a weighted keyword search. The computer receives a user interaction position on the graphical presentation. The computer determines respective weights of the respective keywords, based on proximity of the user interaction position to the respective keywords. The computer conducts a weighted keyword search of documents based on the keywords and the respective weights of the keywords.

DETAILED DESCRIPTION

Embodiments of the present invention are now described in detail with reference to the accompanying figures.

Figure 1:
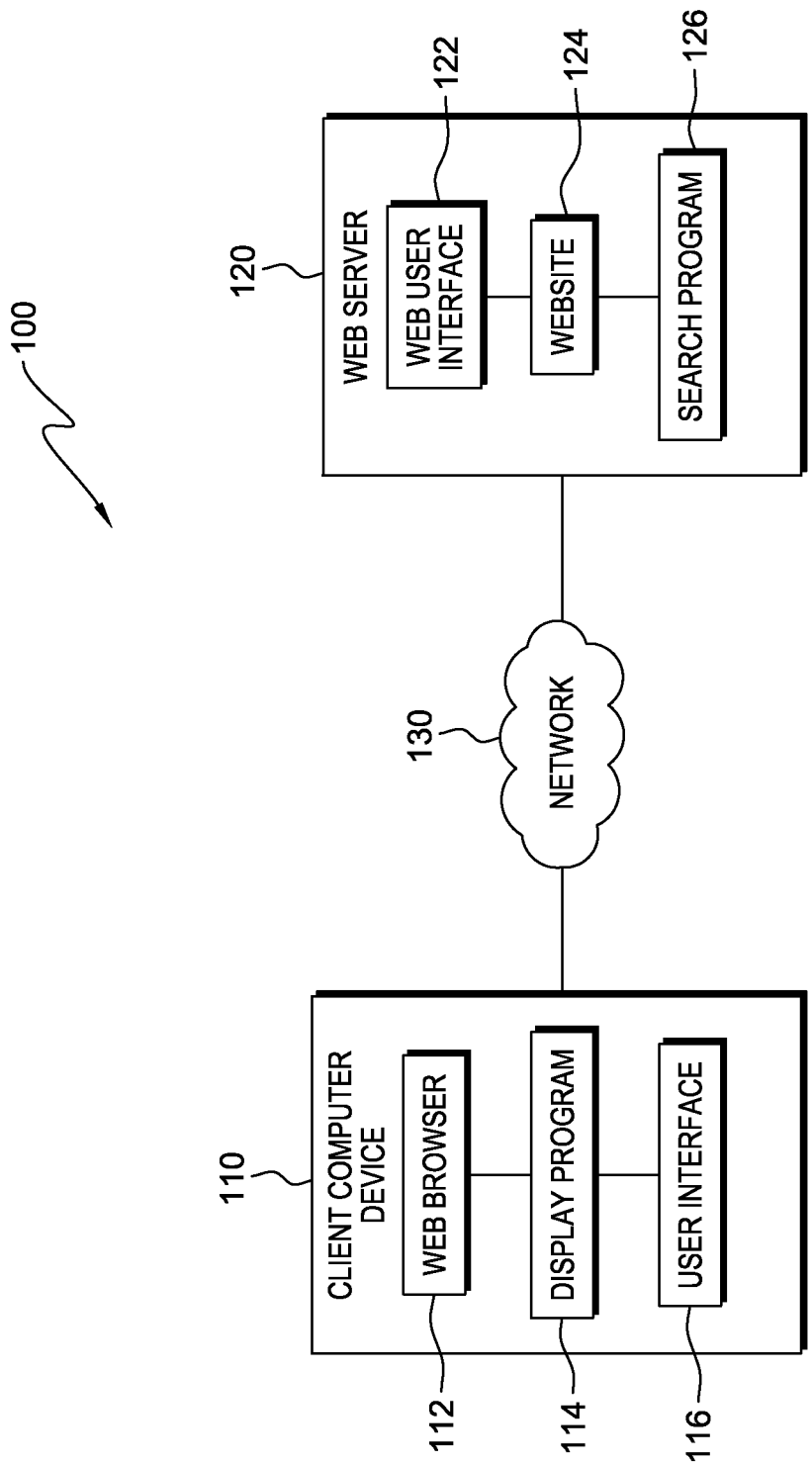
FIG. 1 is a diagram illustrating a system for weighted keyword search using a graphical user interface, in accordance with an exemplary embodiment of the present invention.

FIG. 1 is a diagram illustrating system 100 for weighted keyword search using a graphical user interface, in accordance with an exemplary embodiment of the present invention. System 100 includes client computer device 110 and web server 120 which are interconnected by network 130. Client computing device 110 includes web browser 112, display program 114 for displaying search results based on weights, and user interface 116. Web server 120 includes web user interface 122 to process requests for and download the requested web pages, a collection of HTML documents representing web pages of website 124, and search program 126 for conducting weighted searches in response to user requests.

Display program 114 on client computer device 110 operates in conjunction with web browser 112. Display program 114 displays search results based on weights of respective multiple keywords. The calculation of the weights is based on a user interaction position on a graphic presentation on the display window of web browser 112. While display program 114 in the exemplary embodiment is a separate component, display program 114 in other embodiments may be fully integrated with web browser 112.

Search program 126 on web server 120 receives, from client computer device 110, a user interaction position on a graphic presentation. Based on the interaction position, search program 126 calculates the respective weights of respective multiple keywords. Based on the calculated weights, search program 126 conducts weighted search of resources associated the multiple keywords which are respectively given various weights.

Web browser 112 on client computer device 110 is a program that enables users to view, watch, or listen to documents and other resources, such as audio and video files, retrieved from a network device. In the exemplary embodiment, web browser 112 requests documents and other resources, identified by their URLs (uniform resource locators), from web server 120 via network 130. Web browser 112 on client computer device 110 transmits requests to web user interface 122 on web server 120 for documents and/or resources contained in website 124 on web server 120. Web user interface 122 responds to the requests by retrieving the documents and resources from website 124 and transmitting them back to web browser 112. In the exemplary embodiment, documents and resources retrieved by web browser 112 are viewed by a user of client computer device 110 on a display device, such as display monitor 751 (shown in FIG. 7), via user interface 116 on client computer device 110. In general, web browser 112 may be any browser application capable of execution on a computing device and capable of supporting search and display functionality.

User interface 116 on client computer device 110 includes components used to receive input from a user and transmit the input to an application. User interface 116 uses a combination of technologies and devices, such as device drivers, to provide a platform to enable users to interact with an application. In the exemplary embodiment, user interface 116 receives input, such as input indicating selections within the display window of web browser 112, from a physical input device, such as keyboard 752 or computer mouse 753 (shown in FIG. 7), via a device driver that corresponds to the input device, such as device driver 718 (shown in FIG. 7). User interface 116 communicates these selections to web browser 112 and displays them on display monitor 751 (shown in FIG. 7).

Website 124 on web server 120 is a collection of documents, such as web pages. In the exemplary embodiment, website 124 is a collection of documents in HTML form. Website 124 may also include other resources such as audio files and video files.

Web user interface 122 on web server 120 is a type of graphical user interface that receives input from, for example, a web browser, and provides output to the browser by retrieving documents, such as HTML web pages, and other resources and information from a website. In the exemplary embodiment, web user interface 122 receives input from web browser 112 and provides to web browser 112 web pages and other information from website 124, which are transmitted via network 130 and displayed on display monitor 751 (shown in FIG. 7) of client computer device 110 using web browser 112.

Client computer device 110 may be a desktop computer, a notebook computer, a laptop computer, a tablet computer, a handheld device, a smartphone, a thin client, or any other electronic device or computing system capable of receiving input from a user, executing computer program instructions, and communicating with another computing system via network 130. In general, client computer device 110 is any programmable device that includes a network interface that allows for network connectivity, a display device, a tangible storage device, and a user interface that allows for selection of text and other elements displayed on a display device. Client computer device 110 is described in more detail in later paragraphs with reference to FIG. 7.

Web server 120 may be a desktop computer, a notebook computer, a laptop computer, a tablet computer, a handheld device, a smartphone, a thin client, or any other electronic device or computing system capable of receiving and sending data to and from client computer device 110 via network 130. In the exemplary embodiment, web server 120 is a computing device that is optimized for the support of websites which reside on web server 120, such as website 124, and for the support of network requests related to websites which reside on web server 120. Web server 120 is described in more detail in later paragraphs with reference to FIG. 7. Although not shown, optionally, web server 120 may comprise a cluster of web servers executing the same software to collectively process the requests for the web pages as distributed by a front end server and a load balancer.

In the exemplary embodiment, network 130 is the Internet which represents a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols which support communications between client computer device 110 and web server 120 in accordance with embodiments of the present invention.

Figure 2:
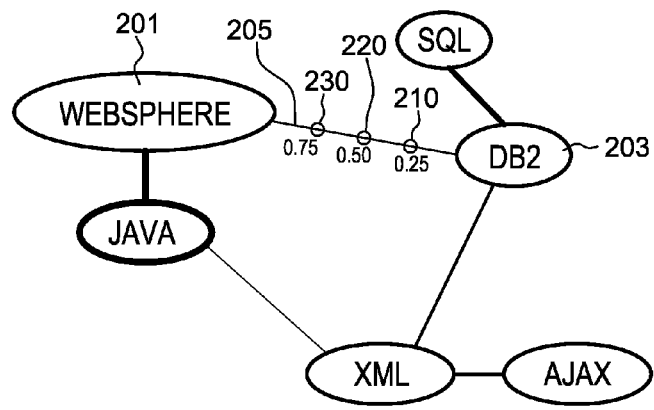
FIG. 2 illustrates an example of determining respective weights of two respective keywords in response to a user interaction position on a node-edge graph, in accordance with an exemplary embodiment of the present invention.

FIG. 2 illustrates an example of determining respective weights of two respective keywords in response to a user interaction position on a node-edge graph, in accordance with an exemplary embodiment of the present invention. In the exemplary embodiment, the graphical presentation is an interactive node-edge graph. On the node-edge graph shown in FIG. 2, a keyword is located at one of nodes, and each edge represents a relationship between two keywords. On the node-edge graph, an edge connecting two nodes representing two keywords is partitioned into n equal segments, and n−1 evenly spaced interactive points are formed. If n is an even number, one of the interactive points is at the center along the edge. Each of the interactive points is assigned a weight number between 0 and 1 (non-inclusive). Any of the interactive points can be selected by a user as the user interaction position. Display program 114 or search program 126 uses the user interaction position to calculate respective weights of respective multiple keywords. It is worthy to mention that the weight number(s) and interactive point(s) shown in FIG. 2 are for the purpose of illustrative explanation and they may not be displayed in the node-edge graph.

In the example shown in FIG. 2, the value of n is assumed to be 4 for the purpose of demonstration. Edge 205 is a line segment. Edge 205 connects nodes 201 and 203 which are respectively at the endpoints of the line segment. Nodes 201 and 203 represent keywords "websphere" and "db2", respectively. Edge 205 is partitioned into 4 segments and, therefore, 3 interactive points 210, 220, and 230 are available on edge 205. As an exemplary convention, the lowest weight number is assigned to an interaction point near a keyword appearing the first in the alphabetical order of the keywords that the edge connects. In the example shown in FIG. 2, the weight number of 0.25 is assigned to keyword "db2" because keyword "db2" is alphabetically listed before keyword "websphere". Therefore, interactive points 210, 220, and 230 are assigned weight numbers 0.25, 0.50, and 0.75, respectively. The assigned weight numbers are weights for a keyword appearing the second in the alphabetical order of the keywords that the edge connects. The weight for a keyword appearing the first in the alphabetical order of the keywords is equal to one minus the assigned weight number. In the example shown in FIG. 2, at interactive points 210, 220, and 230, weights for keyword "websphere" are 0.25, 0.50, and 0.75, respectively; weights for keyword "db2" are 0.75, 0.50, and 0.25, respectively.

Figure 3:
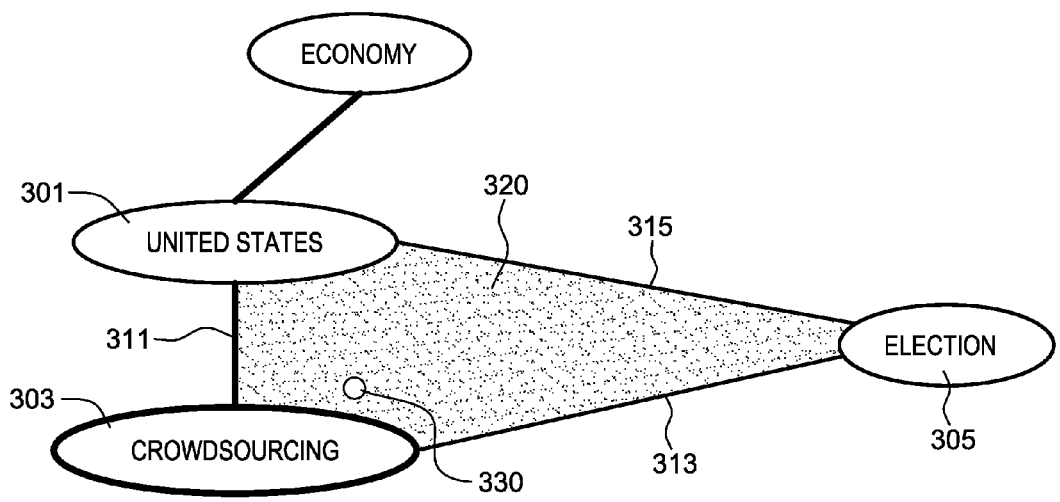
FIG. 3 illustrates an example of determining respective weights of three respective keywords in response to a user interaction position on a node-edge graph, in accordance with an exemplary embodiment of the present invention.

FIG. 3 illustrates an example of determining respective weights of three respective keywords in response to a user interaction position on a node-edge graph, in accordance with an exemplary embodiment of the present invention. In the node-edge graph shown in FIG. 3, node 301 represents keyword "United States", node 303 represents keyword "Crowdsourcing", and node 305 represents keyword "Election". Nodes 301 and 303 are connected by edge 311, nodes 303 and 305 are connected by edge 313, and nodes 301 and 305 are connected by edge 315. Triangle 320 is formed by nodes 301, 303, and 305 and the edges 311, 313, and 315. Nodes 301, 303, and 305 are vertices and edges 311, 313, and 315 are sides of triangle 320. In the example shown in FIG. 3, the shaded area within triangle 320 is an interactive area. Within the interactive area, point 330 is a user interaction position.

In response to the user interaction position at point 330, display program 114 or search program 126 determines respective weights of respective keywords "United States", "Crowdsourcing", and "Election". For example, the weights can be determined by distances between point 330 and respective nodes 301, 303, and 305. A distance between point 330 and node 301 is $d_1$, a distance between point 330 and node 303 is $d_2$, and a distance between point 330 and node 305 is $d_3$. Thus, display program 114 or search program 126 computes the weight of keyword "United States" ($W_1$) as $$\frac{d_1}{d_1 + d_2 + d_3},$$

the weight of keyword "Crowdsourcing" ($W_2$) as $$\frac{d_2}{d_1 + d_2 + d_3},$$

and the weight of keyword "Election" ($W_3$) as $$\frac{d_3}{d_1 + d_2 + d_3}.$$

The example presented in FIG. 3 shows how to determine respective weights of three keywords in response to the user interaction position (point 330) within triangle 320. The method of determining respective weights of three respective keywords can be extended to cases of determining respective weights of more than three respective keywords. For example, for a case of four keywords, four nodes and four edges form a tetragon. Respective weights of the four respective keywords are determined by distances between a user interaction position within the tetragon and respective four vertices of the tetragon. A weight of a specific keyword is the ratio of a distance between the user interaction position and a node representing the specific keyword to a sum of distances between the user interaction position and each of the four nodes. In general, nodes and edges for three or more keywords form an interactive polygon. Respective weights of the three or more respective keywords are determined by distances between a user interaction position within the polygon and respective vertices of the polygon.

Figure 4:
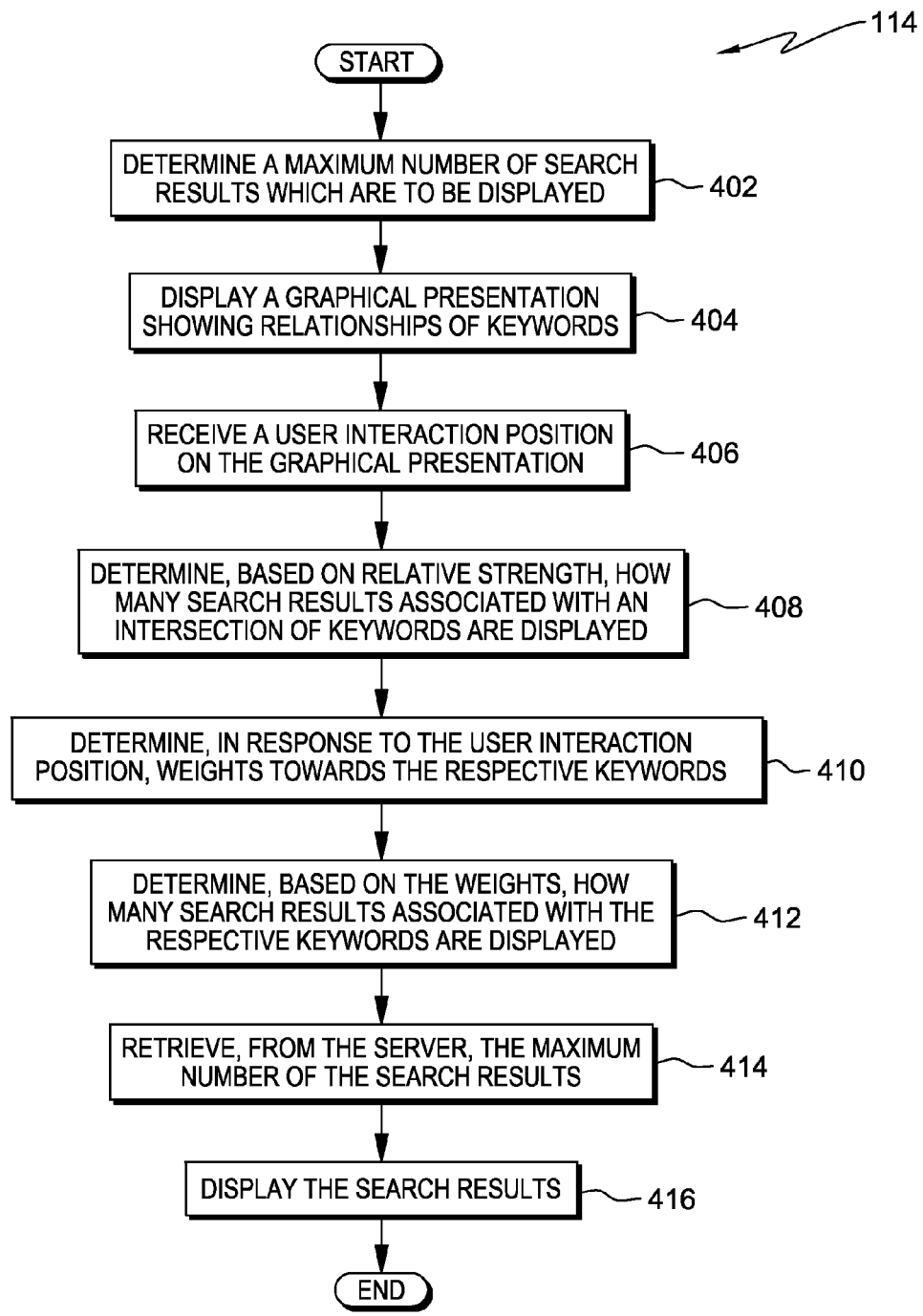
FIG. 4 is a flowchart illustrating functions and operations for displaying search results based on weights which are determined in response to a user interaction position on a node-edge graph, in accordance with an exemplary embodiment of the present invention.

FIG. 4 is a flowchart illustrating functions and operations of display program 114 for displaying search results based on weights which are determined in response to a user interaction position on a node-edge graph, in accordance with an exemplary embodiment of the present invention. In the exemplary embodiment, display program 114 resides on client computer device 110 (as shown in FIG. 1). At step 402, display program 114 determines a maximum number of search results which are to be displayed on a user display device such as computer display monitor 751 (shown in FIG. 7). The maximum number may be determined by user's input. Alternatively, the maximum number may be predetermined by the configuration of display program 114. At step 404, display program 114 displays a graphical presentation which shows relationships of keywords. An example of the graphical presentation is an interactive node-edge graph shown in FIG. 2 or 3. The graphical presentation is displayed on a display device such as display monitor 751. At step 406, display program 114 receives a user interaction position on the graphical presentation (e.g. the node-edge graph). The user interacts with the graphical presentation displayed on a display device such as display monitor 751 and selects a position on the graphical presentation. The user may interact on the graphical presentation by using a pointing device such as computer mouse 753. The user may also interact with the graphical presentation through using a touch screen.

At step 408, display program 114 determines how many search results associated with intersections of the keywords are to be displayed. The number of search results associated with the intersections of the keywords is a first percentage of the maximum number determined at step 402. The determination of the number of search results associated with the intersections of the keywords is based on relative strength of the keywords. The relative strength of the relationship between the keywords, represented by a number between 0 and 1 (or between 0% and 100%), is called a similarity coefficient. The stronger the relationship, the higher value of the similarity coefficient. The similarity coefficient determines what percentage of the maximum number of search results is associated with the intersections of the keywords. The higher the similarity coefficient, the higher percentage of the search results associated with the intersections of the keywords. One way of determining the similarity coefficient is to compute a Jaccard similarity coefficient, also known as a Jaccard index. The Jaccard similarity coefficient measures similarity between sample sets, and is defined as the size of an intersection divided by the size of the union of the sample sets. For example, two sets A and B of search results are associated with keywords 1 and 2 respectively, the Jaccard similarity coefficient (J) of keywords 1 and 2 is computed as:

$$J = \frac{(A \cap B)}{(A \cup B)}.$$

In the exemplary embodiment, the similarity coefficient is computed at predetermined time intervals. When display program 114 determines how many search results associated with the intersections of the keywords are displayed, display program 114 uses the similarity coefficient pre-computed. In the exemplary embodiment, how many search results associated with the intersections of the keywords are displayed is calculated as the maximum number (which is determined at step 402) multiplying by the Jaccard similarity coefficient pre-computed. Determining how many search results associated with the intersections of the keywords are to be displayed is discussed in greater detail in examples with reference to FIGS. 5A, 5B, and 5C.

At step 410, display program 114 determines weights of the respective keywords, in response to the user interaction position. For example, in the node-edge graph, the weights of the respective keywords are determined by distances between the user interaction position and respective nodes each representing a keyword. In other words, the weights are measured by proximity of the user interaction position to the nodes. The closer the user interaction position to a specific node representing a specific keyword, the higher weight of the specific keyword. Determination of the weights is discussed in great detail in previous paragraphs with reference to FIGS. 2 and 3.

At step 412, display program 114 determines how many search results associated with the respective keywords are to be displayed. The total number of search results associated with the respective keywords is a second percentage of the maximum number determined at step 402. The total number of search results associated with the respective keywords is equal to the maximum number (which is determined at step 402) minus the number of search results associated with the intersections of the keywords (which is determined at step 408). The number of search results associated with a specific keyword is determined based on the weight of the specific keywords. The higher weight of the specific keyword, the more search results associated with the specific keyword are displayed. The number of search results associated with the specific keyword is calculated by the total number of search results associated with the respective keywords multiplying the weight of the specific keyword. Determining how many search results associated with the respective keywords are displayed is discussed in greater detail in examples with reference to FIGS. 5A, 5B, and 5C.

At step 414, display program 114 retrieves the maximum number of the search results from web server 120. The maximum number is determined at step 402. The retrieved search results include two parts: first part, search results associated with the intersections of the keywords, which is determined at step 408; second part, search results associated with the respective keywords, which is determined at step 412. At step 416, display program 114 displays the retrieved search results on a display device such as display monitor 751 (shown in FIG. 7) of client computer device 110.

Figure 5A:
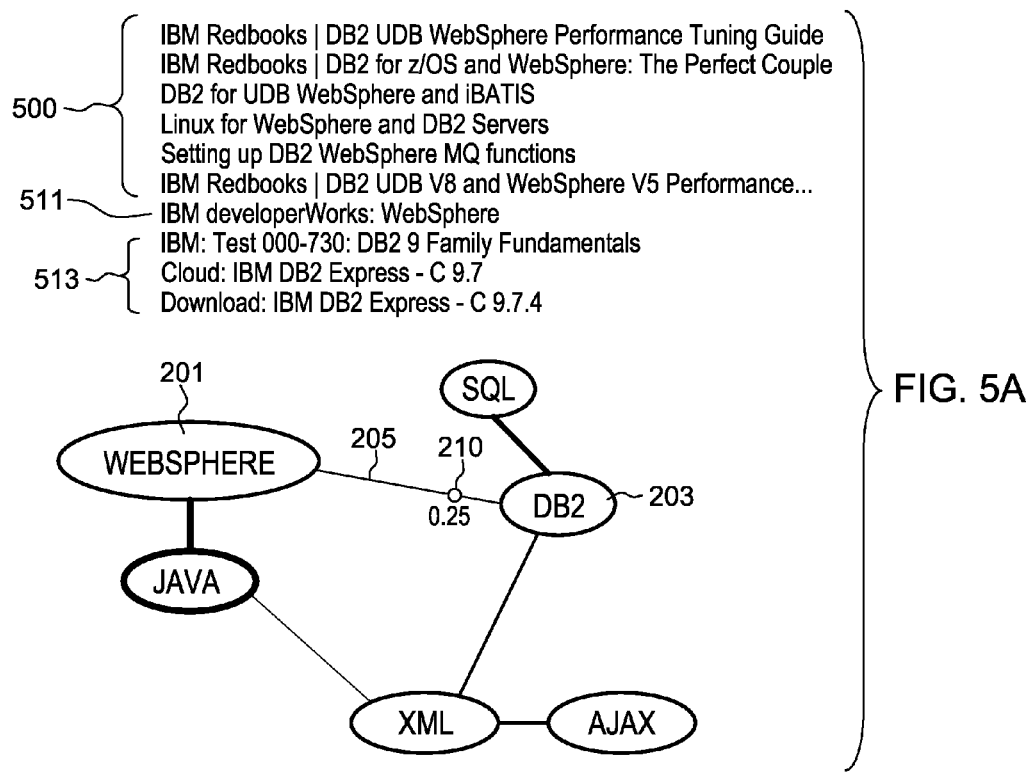
FIGS. 5A, 5B, and 5C illustrate examples of displaying search results based on weights which are determined in response to a user interaction position on a node-edge graph, in accordance with an exemplary embodiment of the present invention.
Figure 5B:
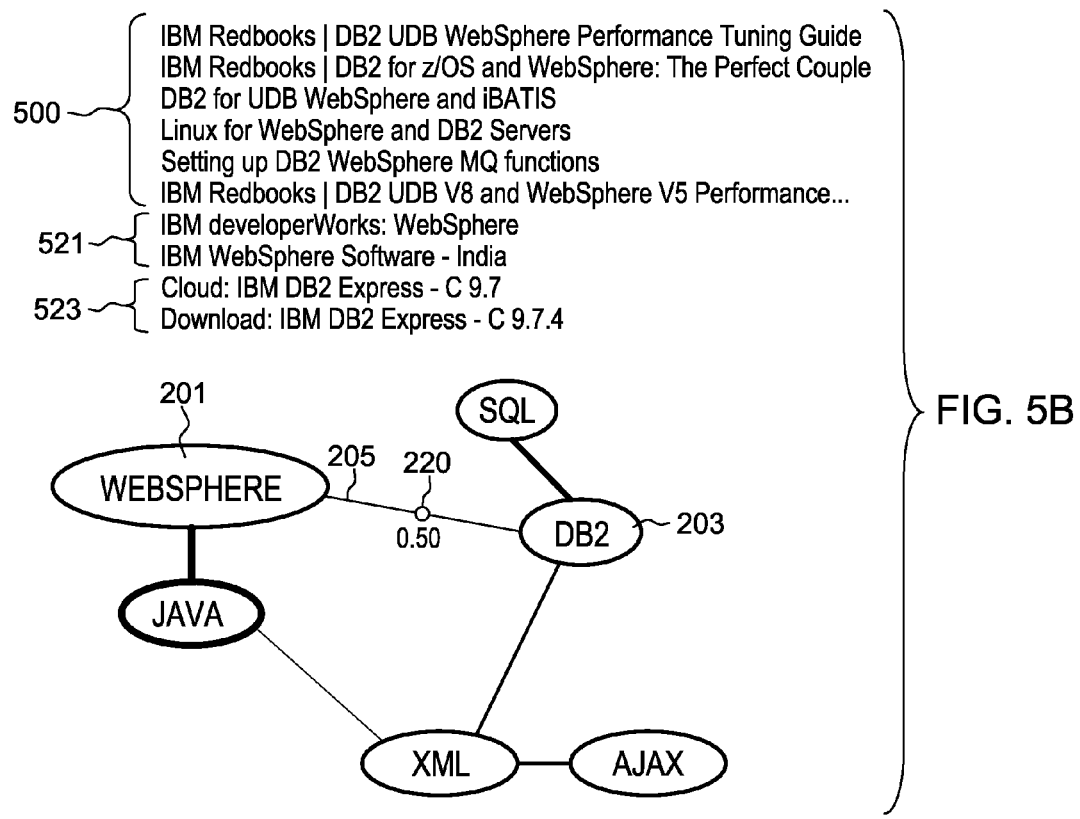
Figure 5C:
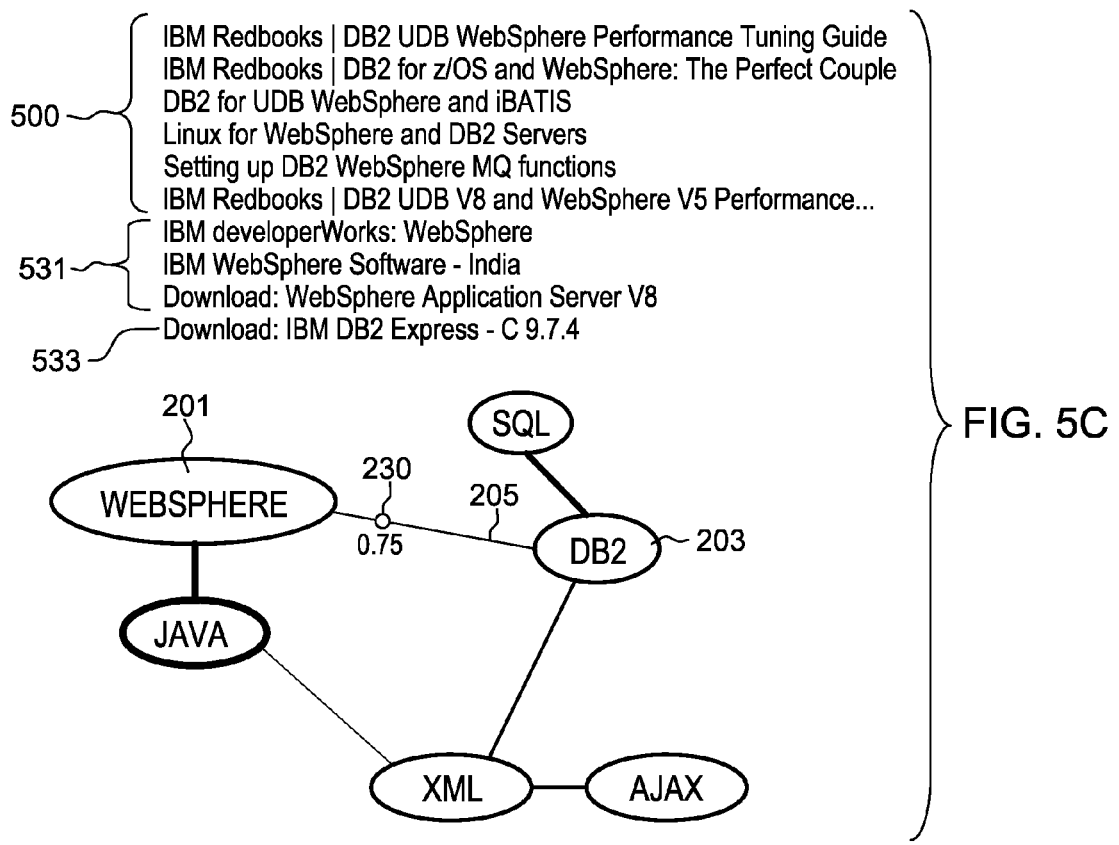

FIGS. 5A, 5B, and 5C illustrate examples of displaying search results based on weights which are determined in response to a user interaction position on a node-edge graph, in accordance with an exemplary embodiment of the present invention. In these examples, the node-edge graph shown in FIG. 2 is used for the demonstrative purpose. In the examples shown in 5A, 5B, and 5C, interactive points 210, 220, and 230 are on edge 205 between nodes 201 and 203. Keywords "websphere" and "db2" are located at nodes 201 and 203, respectively. Interactive points 210, 220, and 230 have respective weights of 0.25, 0.50, and 0.75 for keyword "websphere".

In the examples, the maximum number of search results which are to be displayed is assumed to be 10, and Jaccard similarity coefficient is assumed to be 0.6. Based on the Jaccard similarity coefficient, display program 114 determines how many search results associated with the intersection of "websphere" and "db2" are displayed. The number of search results associated with the intersection of "websphere" and "db2" is calculated as 10×0.6=6. Therefore, display program 114 displays 6 search results associated with the intersection of "websphere" and "db2". The display of the 6 search results associated with the intersection of "websphere" and "db2" is indicated by numeral 500 shown in FIGS. 5A, 5B, and 5C.

The total number of search results associated with keyword "websphere" and search results associated with keyword "db2" are the maximum number (10 in these examples) minus the number of search results associated with the intersection of "websphere" and "db2" (6 in these examples). In the examples, the total number of search results associated with keyword "websphere" and search results associated with keyword "db2" is calculated as 10−6=4.

In response to the user interaction positions, display program 114 determines, based on the weights assigned to the keywords, how many search results are displayed for respective keywords "websphere" and "db2". Referring to FIG. 5A, at interactive point 210, the weight for keyword "websphere" is 0.25, and the weight for keyword "db2" is 0.75. The number of the search results associated with keyword "websphere" is calculated as the total number times the weight for keyword "websphere", i.e. 4×0.25=1. Therefore, display program 114 displays 1 search result associated with keyword "websphere". The display of the 1 search result associated with keyword "websphere" is indicated by numeral 511 in FIG. 5A. The number of the search results associated with keyword "db2" is calculated as the total number times the weight for keyword "db2", i.e. 4×0.75=3. Therefore, display program 114 displays 3 search results associated with keyword "db2". The display of the 3 search results associated with keyword "db2" is indicated by numeral 513 in FIG. 5A.

Referring to FIG. 5B, at interactive point 220, the weight for keyword "websphere" is 0.50, and the weight for keyword "db2" is also 0.50. The number of the search results associated with keyword "websphere" is calculated as the total number times the weight for keyword "websphere", i.e. 4×0.50=2. Therefore, display program 114 displays 2 search results associated with keyword "websphere". The display of the 2 search results associated with keyword "websphere" is indicated by numeral 521 in FIG. 5B. The number of the search results associated with keyword "db2" is calculated as the total number times the weight for keyword "db2", i.e. 4×0.50=2. Therefore, display program 114 displays 2 search results associated with keyword "db2". The display of the 2 search results associated with keyword "db2" is indicated by numeral 523 in FIG. 5B.

Referring to FIG. 5C, at interactive point 230, the weight for keyword "websphere" is 0.75, and the weight for keyword "db2" is 0.25. The number of the search results associated with keyword "websphere" is calculated as the total number times the weight for keyword "websphere", i.e. 4×0.75=3. Therefore, display program 114 displays 3 search results associated with keyword "websphere". The display of the 3 search results associated with keyword "websphere" is indicated by numeral 531 in FIG. 5C. The number of the search results associated with keyword "db2" is calculated as the total number times the weight for keyword "db2", i.e. 4×0.25=1. Therefore, display program 114 displays 1 search result associated with keyword "db2". The display of the 1 search result associated with keyword "db2" is indicated by numeral 533 in FIG. 5C.

FIGS. 5A, 5B, and 5C illustrate examples of displaying search results associated with two keywords. In this paragraph, an example of displaying search results associated with three keywords is discussed. In the example, display program 114 displays search results associated with three keywords shown in FIG. 3. To display search results associated with three keywords, display program 114 determines how many search results associated with an intersection of three keywords and how many search results associated with intersections of any two keywords of the three keywords are to be displayed. In the example of three keywords, the Jaccard similarity coefficients are as follows: $C_1$ for three keywords "United States", "Crowdsourcing", and "Election"; $C_2$ for two keywords "United States" and "Crowdsourcing"; $C_3$ for two keywords "Crowdsourcing" and "Election"; and $C_4$ for two keywords "United States" and "Election". Values of $C_1$, $C_2$, $C_3$, and $C_4$ are between 0 and 1 (or between 0% and 100%). In the example, the maximum number of search results which are to be displayed is M. Display program 114 determines to display M×$C_1$ search results associated with an intersection of three keywords "United States", "Crowdsourcing", and "Election". Display program 114 determines to display search results associated with intersections of any two keywords of the three keywords as follows: M×($C_2$−$C_1$) search results associated with the intersection of two keywords "United States" and "Crowdsourcing"; M×($C_3$−$C_1$) search results associated with the intersection of two keywords "Crowdsourcing" and "Election"; and M×($C_4$−$C_1$) search results associated with the intersection of two keywords "United States" and "Election".

In the example of three keywords, display program 114 determines how many search results associated with each of keywords "United States", "Crowdsourcing", and "Election" are displayed, based on the weights calculated using a method discussed in a previous paragraph with reference to FIG. 3. The weight of "United States" is $W_1$, the weight of "Crowdsourcing" is $W_2$, and the weight of "Election" is $W_3$. In the example, M is the maximum number of search results that are to be displayed, m is the total number of displayed search results associated with the intersection of three keywords and associated with the intersections of the two keywords. Display program 114 determines to display $W_1$×(M−m) search results associated with keyword "United States", $W_2$×(M−m) search results associated with keyword "Crowdsourcing", and $W_3$×(M−m) search results associated with keyword "Election".

Figure 6:
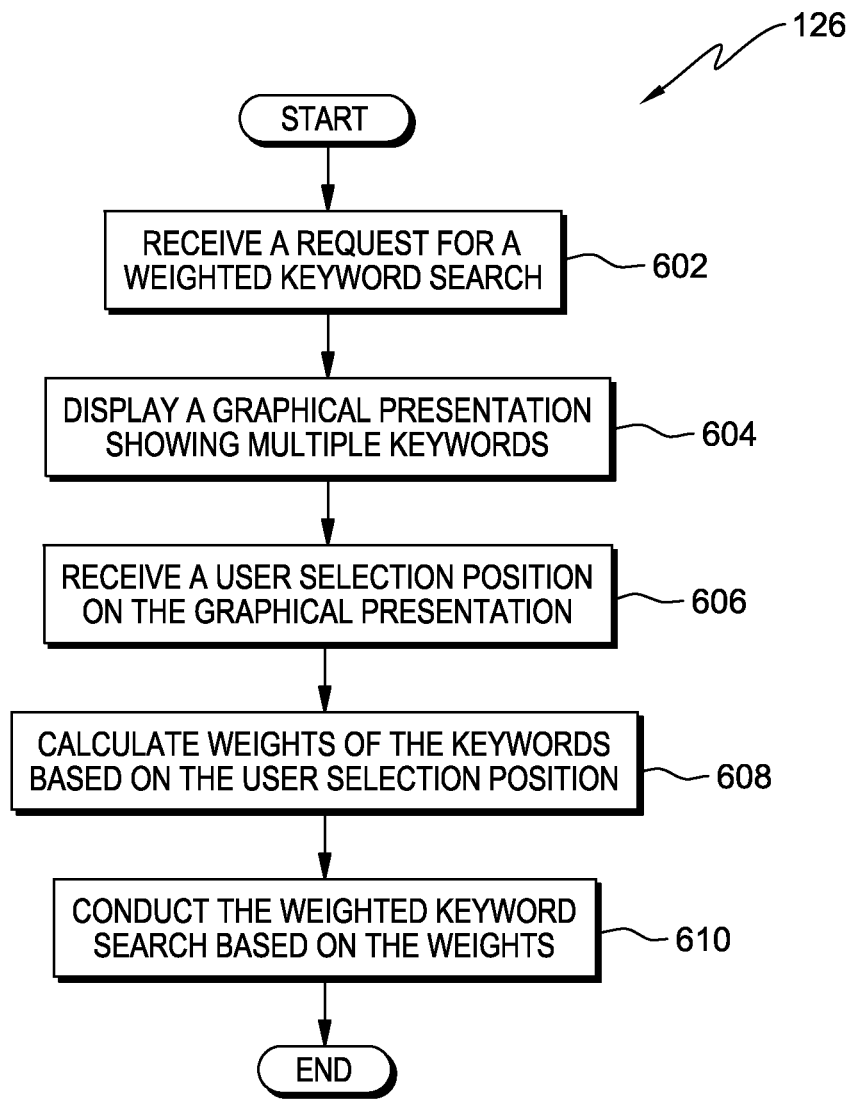
FIG. 6 is a flowchart illustrating functions and operations for conducting weighted keyword search based on weights which are determined in response to a user interaction position on a node-edge graph, in accordance with an exemplary embodiment of the present invention.

FIG. 6 is a flowchart illustrating functions and operations of search program 126 for conducting weighted keyword search based on weights which are determined in response to a user interaction position on a node-edge graph, in accordance with an exemplary embodiment of the present invention. In the exemplary embodiment, search program 126 is hosted by web server 120 as shown in FIG. 1. At step 602, search program 126 receives, from client computer device 110 (shown in FIG. 1), a request for a weighted keyword search. To start a keyword search, a user of client computer device 110 inputs at least one keyword from an input device such as keyboard 752 or computer mouse 753 (shown in FIG. 7). The user may type the at least one keyword by using keyboard 752 or select the at least one keyword from a menu listing keywords by using computer mouse 753.

At step 604, search program 126 displays a graphical presentation showing keywords on a display device of client computer device 110. The graphical presentation comprises a polygon with three to ten (or more) sides/edges, and a different keyword at each of the corners of the polygon and optionally, additional keywords on a side/edge between the corners. In one embodiment of the present invention, each of the keywords will be included in the keyword search, although some of the keywords will have greater weight in the search than others as described below. An example of the graphical presentation is an interactive node-edge graph shown in FIG. 2 or 3. The node-edge graph is discussed in previous paragraphs with reference to FIG. 2 or 3. In FIG. 2 or 3, the node-edge graph includes nodes for respective keywords and edges between the nodes. The user, with a mouse cursor can select a point anywhere within the polygon or on the sides/edges connecting two keywords. The search program 126 then determines the proximity of the user-selected point to each of the keywords on the corners or sides of the polygon. The proximity of the user selected point to each of the keywords on the polygon indicates the weight of the keyword in the resultant keyword search. FIG. 3 illustrates a triangle formed by three edges connecting three nodes is an interactive area. The three nodes are three vertices/corners of the triangle and three keywords are respectively located at three vertices. The user can interact with the graph by selecting a point anywhere within the triangle or on an edge of the triangle. For a general case of three or more keywords, a polygon formed by n edges connecting n nodes is an interactive area. The n keywords are located respectively at vertices of the polygon.

At step 606, search program 126 receives a user selection position on the graphical presentation. In the exemplary embodiment, the user selects a point on the edge shown in FIG. 2 or within the triangle shown in FIG. 3. At step 608, search program 126 calculates weights of respective keywords in response to the user selection position received at step 606. Algorithms of calculating the weights are discussed in previous paragraphs with reference to FIGS. 2 and 3. Determination of the weights is based on proximity of the user interaction position to the respective keywords on the graphical presentation. More specifically, on the node-edge graph, a weight of a specific keyword on a node is calculated as a ratio of a distance between the user interaction position and the node to a sum of distances between the user interaction position and each of the keywords. The closer the user selection position to the node of the specific keyword, the greater weight of the specific keyword. (In an alternate embodiment of the present invention, if the user-selected point is the furthest away on the polygon from one of the keywords, the weight can be zero.)

At step 610, search program 126 conducts the weighted keyword search based on the weights which are calculated at step 608. As follows, an exemplary algorithm of the weighted search is discussed. Persons of ordinary skill in the art will understand that that the weights can be integrated into various search algorithms for weighted search. The search algorithm described in the next paragraph is exemplary.

In weighted search of L documents containing searchable words or phrases, search program 126 searches each of the L documents with N keywords that are displayed at the corners of the polygon. Each of N keywords has a weight from the user-selected point on the polygon; therefore, there are N weights: $W_1, W_2, \ldots, W_N$. $W_1$ is the weight for keyword 1, $W_2$ is the weight for keyword 2, ..., and $W_N$ is the weight for keyword N. Each of the weights is less than one and greater than zero (except in the alternate embodiment noted above); the sum of the N weights is equal to one. The N weights have been calculated at step 608. Search program 126 then searches for documents that include all of the keywords displayed at the corners of the polygon (except in the alternate embodiment noted above), with numbers of occurrences of significance of the keywords that approximate the weights determined from the user selected point on the polygon. For example, if the user selected point on the polygon is very close to one of the keywords, the search program will search for documents which include more instances of more significant instances of this keyword than the other keywords at the other corners of the polygon. Thus, search program 126 determines the number of words or phrases that match each of the N keywords in documents. In one of the L documents, search program 126 finds $M_1$ words or phrases matching keyword 1, $M_2$ words or phrases matching keyword 2, ..., and $M_N$ keyword N. Then, search program 126 calculates the relative ranking (R) for the one of the L documents based on how well the occurrences of the keywords in the one of the L documents matches the user indicated weights of the respective keywords as indicated by the user-selected point in the polygon. $R_1$ is the relative ranking for document 1, $R_2$ is the relative ranking for document 2, ..., and $R_L$ is the relative ranking for document L. The relative ranking for i-th document ($R_i$) is calculated as $$R_i = \sum_{n=1}^{N} (W_n \times M_n).$$

Search program 126 ranks the L documents according to the relative rankings $R_1, R_2, \ldots,$ and $R_L$. The higher the value of the relative ranking, the higher the rank of a document. Optionally, the locations of a keyword in the documents can also affect the word/phrase count $M_n$ in the equation, i.e. the significance of the keyword in the document. For example, each instance of the keyword that appears in a title, abstract or summary of a document may be counted as two instances of the keyword in the document. Such doubling of these instances of the keyword is considered in determining the word/phrase count in the equation, i.e. the weight of the keyword in the document.

Figure 7:
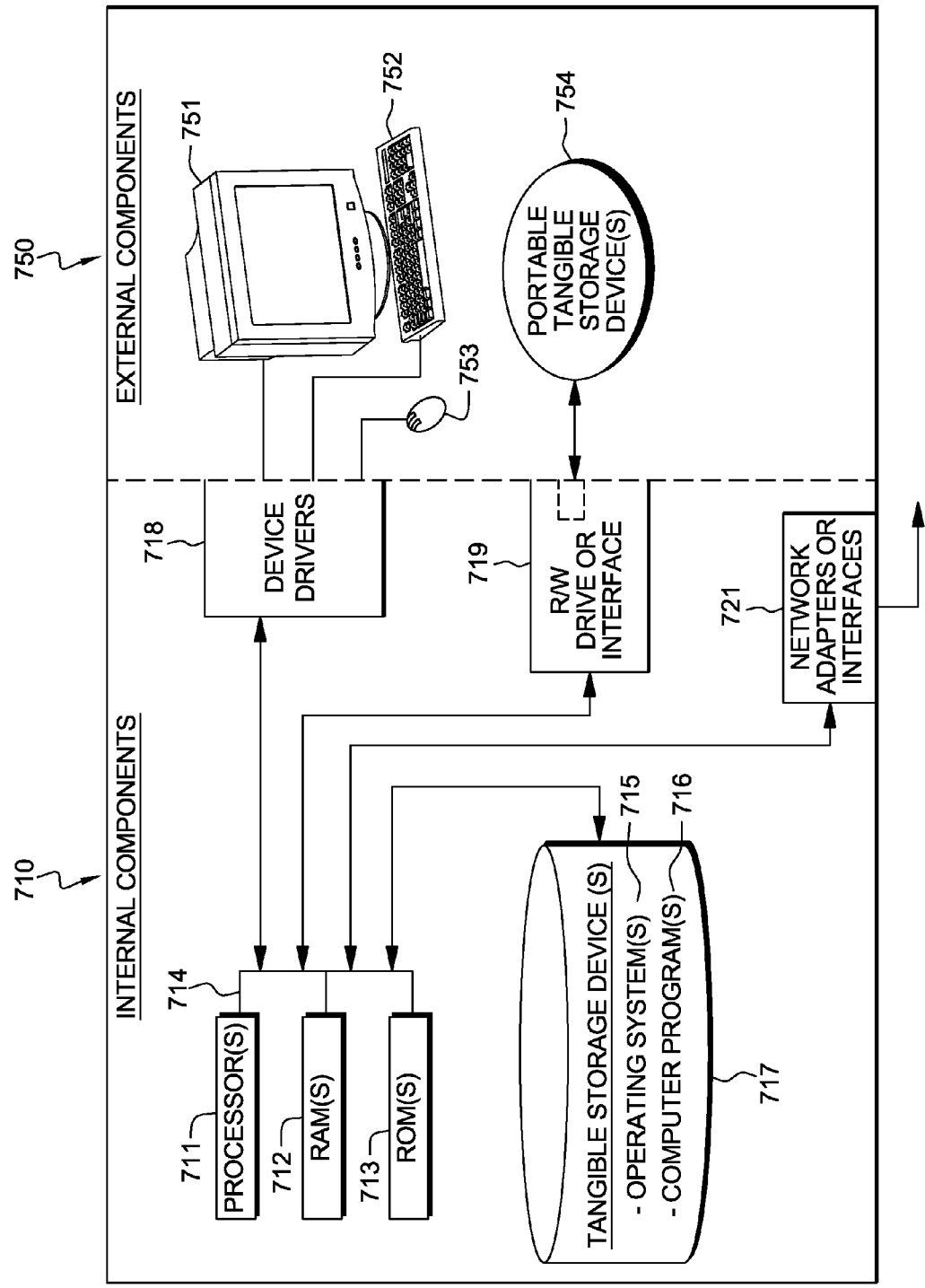
FIG. 7 illustrates internal and external components of a client computer device or a web server shown in FIG. 1, in accordance with an exemplary embodiment of the present invention.

Client computer device 110 or web server 120 shown in FIG. 1 include one or more sets of internal components 710 and external components 750 shown in FIG. 7. Each of the one or more sets of internal components 710 includes, on one or more buses 714, one or more processors 711, one or more computer-readable RAMs 712, and one or more computer-readable ROMs 713. Also, each of the one or more sets of internal components 710 includes, on one or more computer-readable tangible storage devices 717, one or more operating systems 715 and one or more computer programs 716. In the preferred embodiment of the present invention, one or more computer programs 716 on client computer device 110 include web browser 112, display program 114, and user interface 116 (shown in FIG. 1); one or more computer programs 716 on web server 120 include web user interface 122, website 124, and search program 126 (shown in FIG. 1). One or more computer programs 716 are executed by one or more processors 711 via one or more computer-readable RAMs 712 (which typically include cache memory). In the embodiment illustrated in FIG. 7, one or more computer-readable tangible storage devices 717 are magnetic disk storage devices of internal hard disks, semiconductor storage devices, read-only memory (ROM), erasable programmable read only memory (EPROM), flash memory, or any other computer-readable tangible storage devices that can store a computer programs and digital information.

Each of the one or more sets of internal components 710 also includes R/W drive or interface 719 to read from or write to one or more portable computer-readable tangible storage devices 754 such as a CD-ROM, DVD, memory stick, magnetic tape, magnetic disk, optic disk, or semiconductor storage device. Respective one or more computer programs 716 can be stored on respective one or more portable computer-readable tangible storage devices 754, read through respective R/W drive or interface 719 and loaded into respective one or more computer-readable tangible storage devices 717.

Each of the one or more sets of internal components 710 also includes network adapters or interfaces 721 such as TCP/IP adapter cards, wireless Wi-Fi™ interface cards, 3G or 4G wireless interface cards, or other wired or wireless communication links. Web browser 112, display program 114, user interface 116, web user interface 122, website 124, and search program 126 can be downloaded to client computer devices 110 and/or web server 120 via network 130 (shown in FIG. 1) and respective network adapters or interfaces 721. From respective network adapters or interfaces 721, Web browser 112, display program 114, user interface 116, web user interface 122, website 124, and search program 126 can be loaded into respective one or more computer-readable tangible storage devices 717 of computer devices 110 and/or web server 120. Network 130 may comprise copper wires, optic fibers, wireless transmission, routers, firewalls, switches, gateway computers, and/or edge servers.

Each of the one or more sets of external components 750 can include a computer display monitor 751, keyboard 752, and computer mouse 753. External components 750 can also include touch screens, virtual keyboards, touch pads, pointing devices, and other human interface devices. Each of the one or more sets of internal components 710 also includes device drivers 718 to interface to computer display monitor 751, keyboard 752, and computer mouse 753. Device drivers 718, R/W drive or interface 719, and network adapters or interfaces 721 comprise hardware and software. The software is stored on at least one of the one or more computer-readable tangible storage devices 717 and/or ROMs 713.

The aforementioned programs can be written in any combination of one or more programming languages including low-level, high-level, object-oriented or non object oriented languages such as Java®, smalltalk, C and C++. Alternatively, the functions of the aforementioned programs can be implemented in whole or in part by computer circuits and other hardware (not shown in FIG. 7).

Based on the foregoing, a method, computer system, and computer program product have been disclosed in accordance with embodiments of the present invention. However, numerous modifications and substitutions can be made without deviating from the scope of the present invention. Therefore, the present invention has been disclosed by way of example and not limitation.

What is claimed is:

1. A method for displaying search results, the method comprising steps of:
- a computer displaying respective keywords on a graphical presentation, the graphical presentation comprising respective nodes representing the respective keywords and lines connecting the respective nodes;
- the computer receiving a user interaction position on an area surrounded by the lines connecting the respective nodes;
- the computer determining respective weights of the respective keywords, based on proximity of the user interaction position to the respective keywords;
- the computer displaying the search results associated with the respective keywords, based on the respective weights;
- wherein the user interaction position is within a polygon formed by three or more lines connecting three or more nodes representing three or more keywords; and
- wherein a weight of a specific one of the three or more keywords is determined based on a ratio of a distance between the user interaction position and a specific one of the three or more nodes to a sum of distances between the user interaction position and each of the three or more nodes, wherein the specific one of the three or more nodes represents the specific one of the three or more keywords.

2. The method of claim 1, wherein, for two keywords, the user interaction position is on a line connecting two nodes representing the two keywords.

3. The method of claim 2, wherein a weight of a specific one of the two keywords is determined based on a ratio of a distance between the user interaction position and a specific one of the two nodes to a sum of distances between the user interaction position and each of the two nodes, wherein the specific one of the two nodes represents the specific one of the two keywords.

4. The method of claim 1, wherein how many search results associated with a specific one of the respective keywords are to be displayed is determined by multiplying a total number of search results associated with the respective keywords by a specific one of the respective weights, wherein the specific one of the respective weights is for the specific one of the respective keywords.

5. A method for conducting a weighted keyword search, the method comprising steps of:
- a computer displaying a graphical presentation showing respective keywords, in response to receiving a request for a weighted keyword search, the graphical presentation comprising respective nodes representing the respective keywords and lines connecting the respective nodes;
- the computer receiving a user interaction position on an area surrounded by the lines connecting the respective nodes;
- the computer determining respective weights of the respective keywords, based on proximity of the user interaction position to the respective keywords;
- the computer conducting the weighted keyword search of documents based on the keywords and the respective weights of the keywords;
- wherein the user interaction position is within a polygon formed by three or more lines connecting three or more nodes representing three or more keywords; and
- wherein a weight of a specific one of the three or more keywords is determined based on a ratio of a distance between the user interaction position and a specific one of the three or more nodes to a sum of distances between the user interaction position and each of the three or more nodes, wherein the specific one of the three or more nodes represents the specific one of the three or more keywords.

6. The method of claim 5, wherein, for the weighted keyword search related to two keywords, the user interaction position is on a line connecting two nodes representing the two keywords.

7. The method of claim 6, wherein a weight of a specific one of the two keywords is determined based on a ratio of a distance between the user interaction position and a specific one of the two nodes to a sum of distances between the user interaction position and each of the two nodes, wherein the specific one of the two nodes represents the specific one of the two keywords.

8. A computer program product for conducting a weighted keyword search, the computer program product comprising:
- one or more computer-readable tangible storage devices and program instructions stored on at least one of the one or more computer-readable tangible storage devices, the program instructions comprising:
- program instructions to display a graphical presentation showing respective keywords, in response to receiving a request for a weighted keyword search, the graphical presentation comprising respective nodes representing the respective keywords and lines connecting the respective nodes;
- program instructions to receive a user interaction position on an area surrounded by the lines connecting the respective nodes;
- program instructions to determine respective weights of the respective keywords, based on proximity of the user interaction position to the respective keywords;
- program instructions to conduct the weighted keyword search of documents based on the keywords and the respective weights of the keywords;
- wherein the user interaction position is within a polygon formed by three or more lines connecting three or more nodes representing three or more keywords; and
- wherein a weight of a specific one of the three or more keywords is determined based on a ratio of a distance between the user interaction position and a specific one of the three or more nodes to a sum of distances between the user interaction position and each of the three or more nodes, wherein the specific one of the three or more nodes represents the specific one of the three or more keywords.

9. The computer program product of claim 8, wherein, for the weighted keyword search related to two keywords, the user interaction position is on a line connecting two nodes representing the two keywords.

10. The computer program product of claim 9, wherein a weight of a specific one of the two keywords is determined based on a ratio of a distance between the user interaction position and a specific one of the two nodes to a sum of distances between the user interaction position and each of the two nodes, wherein the specific one of the two nodes represents the specific one of the two keywords.

* * * * *